US010618822B1

(12) United States Patent
Smith-Taylor et al.

(10) Patent No.: US 10,618,822 B1
(45) Date of Patent: Apr. 14, 2020

(54) CHEMICAL DISPENSING SYSTEM

(71) Applicants: Damian Shaun Smith-Taylor, Warrensburg, MO (US); Kevin Eugene Konnis, Phoenix, AZ (US)

(72) Inventors: Damian Shaun Smith-Taylor, Warrensburg, MO (US); Kevin Eugene Konnis, Phoenix, AZ (US)

( * ) Notice: Subject to any disclaimer, the term of this patent is extended or adjusted under 35 U.S.C. 154(b) by 0 days.

(21) Appl. No.: 16/554,071

(22) Filed: Aug. 28, 2019

Related U.S. Application Data

(63) Continuation-in-part of application No. 16/240,541, filed on Jan. 4, 2019, now Pat. No. 10,435,901.

(51) Int. Cl.
| | |
|---|---|
| *B01D 11/02* | (2006.01) |
| *A61L 2/00* | (2006.01) |
| *C02F 1/76* | (2006.01) |
| *E03B 11/00* | (2006.01) |
| *C02F 1/00* | (2006.01) |
| *E04H 4/12* | (2006.01) |
| *C02F 103/42* | (2006.01) |

(52) U.S. Cl.
CPC .......... *C02F 1/006* (2013.01); *E04H 4/1209* (2013.01); *E04H 4/1281* (2013.01); *C02F 2103/42* (2013.01); *C02F 2303/04* (2013.01)

(58) Field of Classification Search
CPC .. A61L 2/0088; A61L 2/18; C02F 1/00; C02F 11/00; C02F 220/00; C02F 1/006; C02F 1/688; B05B 11/0013; B05B 11/0038; B05B 11/00412; E04H 4/1209; E04H 4/1281

USPC ....... 422/261, 275–278, 274, 282, 292, 297, 422/300, 902; 210/754, 167.11, 206, 97, 210/198.1, 205, 167.1, 450; 137/268, 845
See application file for complete search history.

(56) References Cited

U.S. PATENT DOCUMENTS 1,814,572 A * 7/1931 Shaffer .................. A01C 15/02
422/274

* cited by examiner

*Primary Examiner* — Monzer R Chorbaji
(74) *Attorney, Agent, or Firm* — Donna Denise Mashburn Chapman; Mashburn Law Office, LLC

(57) ABSTRACT

A chemical dispensing system broadly including a mounting ring, a connector ring, a water guide, and a dispenser apparatus. The mounting ring securely attaches to a water return jet in a swimming pool or spa. The connector ring couples the water guide to the mounting ring. The dispenser apparatus may be attached to a side opening of the water guide and broadly includes a housing, and a porous cover. The housing broadly includes an interior chamber and chemical exit openings. Sanitizing chemicals may be placed in the interior chamber. The dispenser apparatus may further include an adjustable basket. The housing may rotatably nest inside the adjustable basket, thereby regulating the sanitizing chemical dispersal rate. Pressurized water from the return jet flows through the water guide, creating a downward current within the dispenser apparatus. The sanitizing chemicals dissolve as the water flows downward through and exits the dispensing apparatus.

19 Claims, 6 Drawing Sheets

CHEMICAL DISPENSING SYSTEM

RELATED APPLICATION

This application is a continuation-in-part of non-provisional application Ser. No. 16/240,541 ("the '541 Application") filed on Jan. 4, 2019, and entitled "CHEMICAL DISPENSING APPARATUS." The '541 Application is hereby incorporated by reference in its entirety.

FIELD OF INVENTION

Embodiments of the present invention relate generally to the field of chemical dispensing systems that function to treat a body of water. More specifically, the present invention relates to chemical dispensing systems that disperse one or more sanitizing chemicals in a swimming pool or a spa.

SUMMARY

The present invention is a chemical dispensing system including a mounting ring, a connector ring, a water guide, and a dispenser apparatus. The mounting ring securely attaches to a water return jet in a swimming pool or spa and includes grip ridges, internal thread, and two or more attachment apertures. The connector ring securely attaches the water guide to the mounting ring. The shape of the water guide may vary to direct the flow of treated water in different directions throughout a body of water. The water guide broadly includes a side opening for receiving the dispenser apparatus. The dispenser apparatus broadly includes a housing and a porous cover. The housing contains one or more sanitizing chemicals and may be rotated within the water guide to regulate the sanitizing chemical dispersal rate. In another embodiment, the dispenser apparatus further includes an adjustable basket. The housing is secured to and nests inside the adjustable basket.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
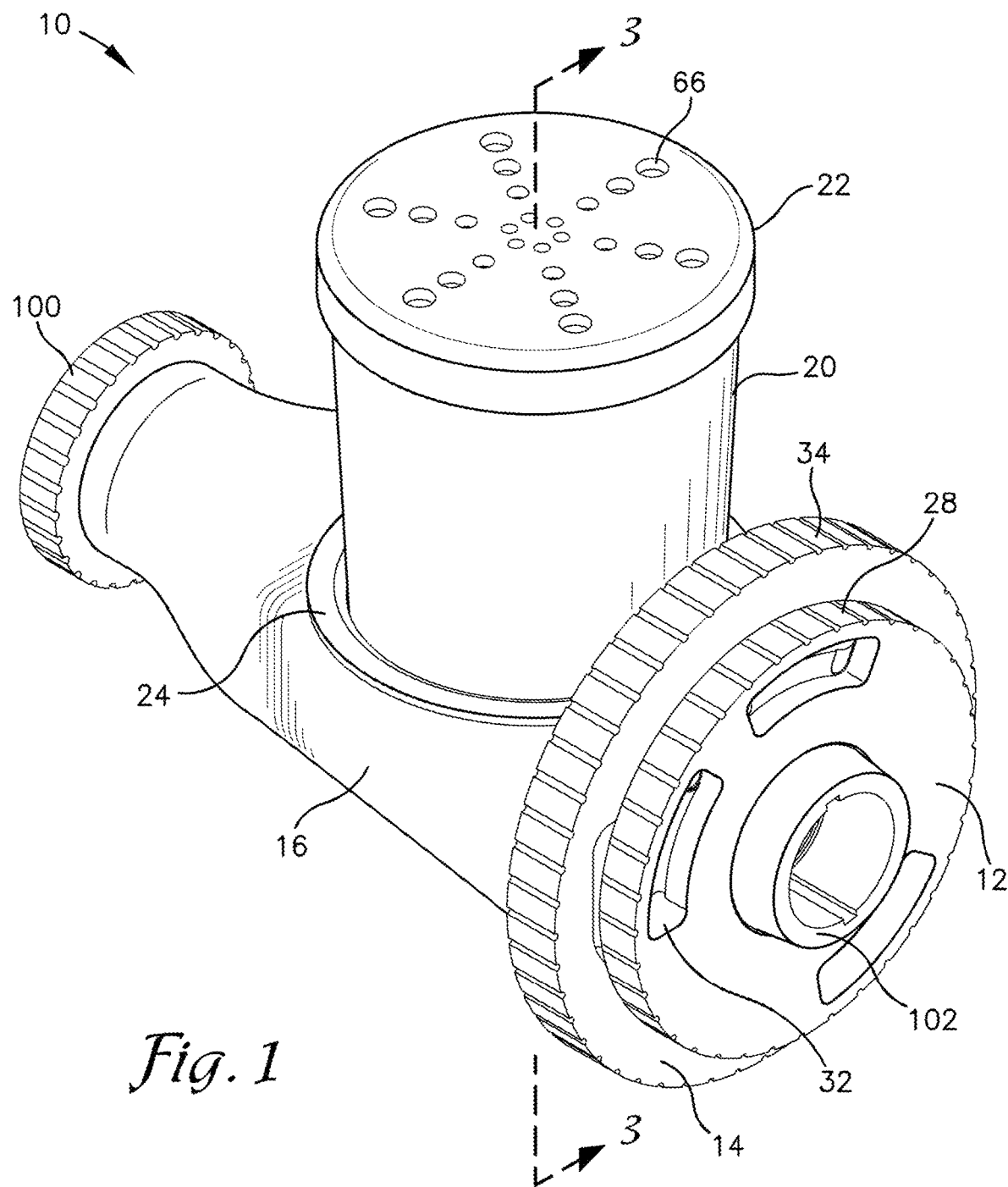
FIG. 1 is a perspective view of a chemical dispensing system attached to a water return jet, constructed in accordance with an embodiment of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
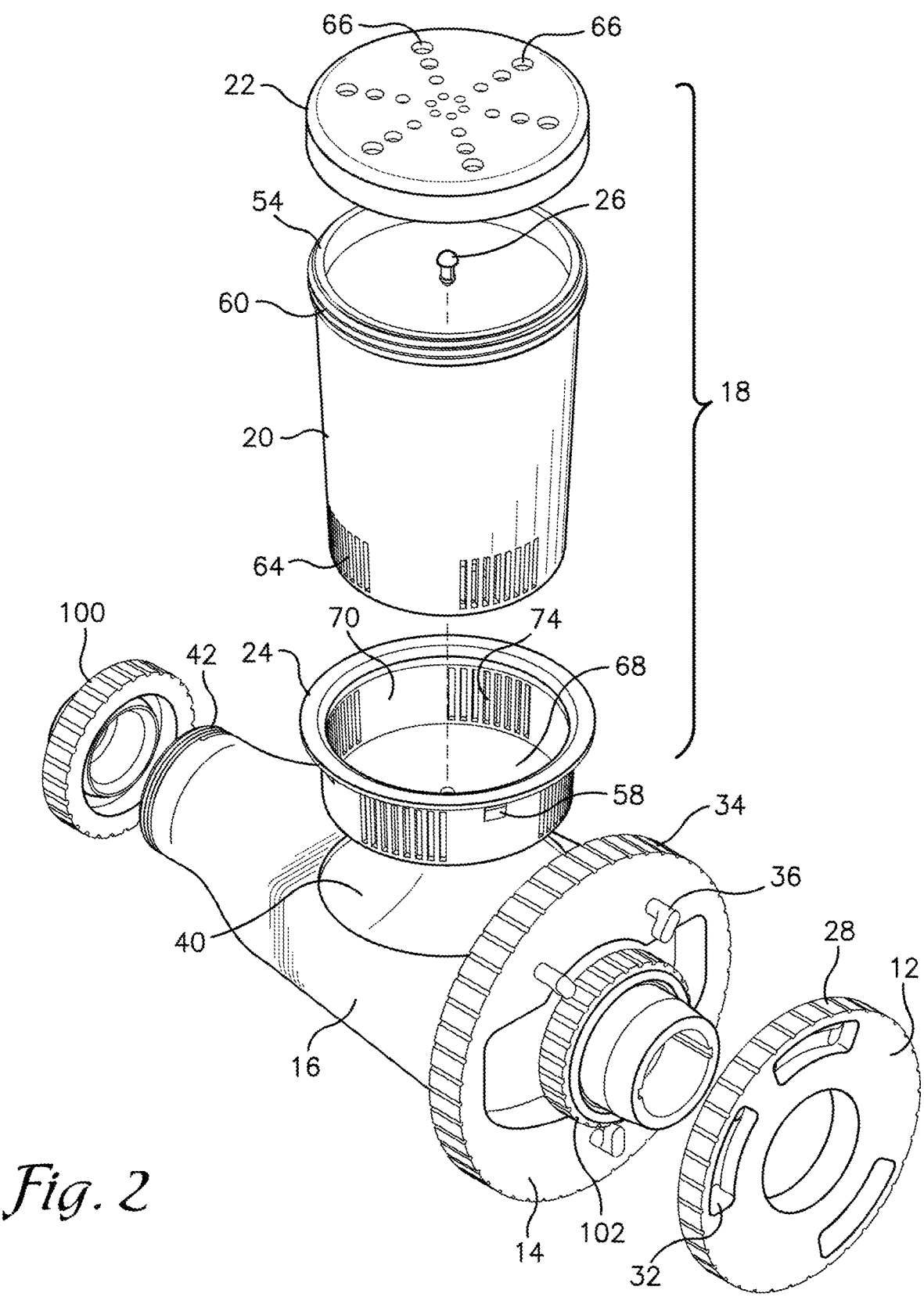
FIG. 2 is an exploded view of the chemical dispensing system shown in FIG. 1, constructed in accordance with an embodiment of the present invention.
Figure 3:
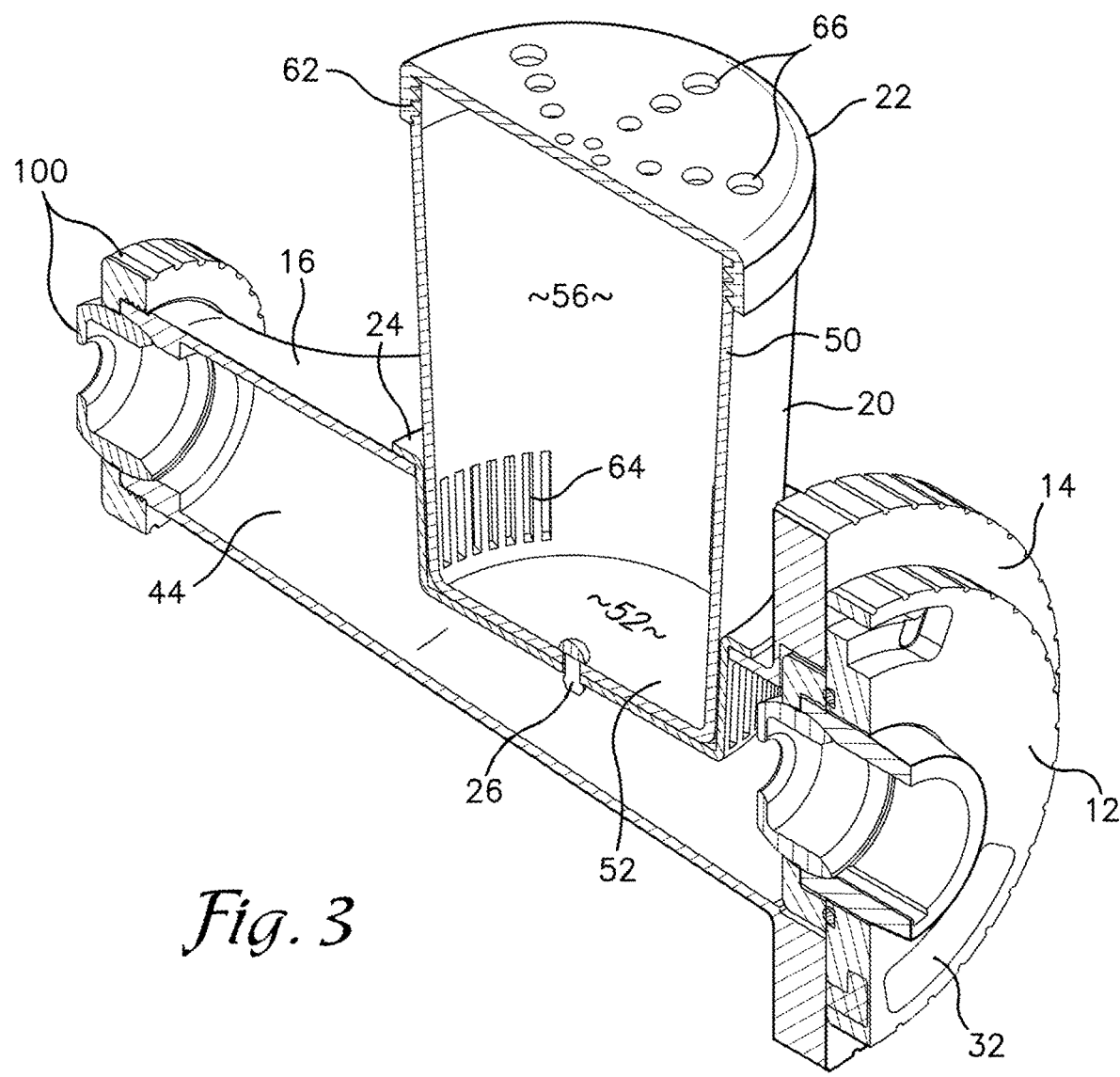
FIG. 3 is a cutaway view showing the interior structures of the chemical dispensing system of FIG. 1, constructed in accordance with an embodiment of the present invention.
Figure 4:
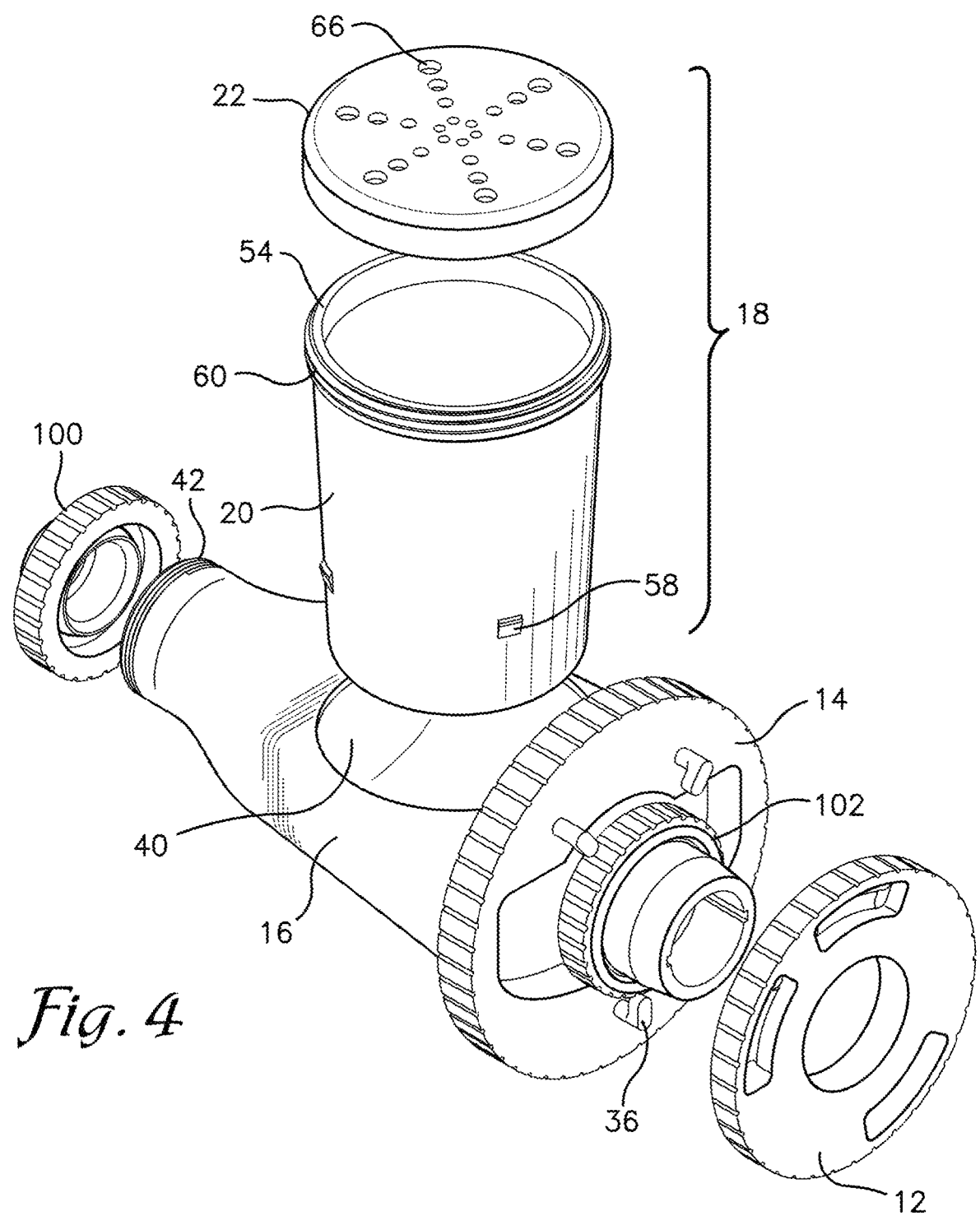
FIG. 4 is an exploded view of the chemical dispensing system without an adjustable basket, constructed in accordance with an embodiment of the present invention.
Figure 5:
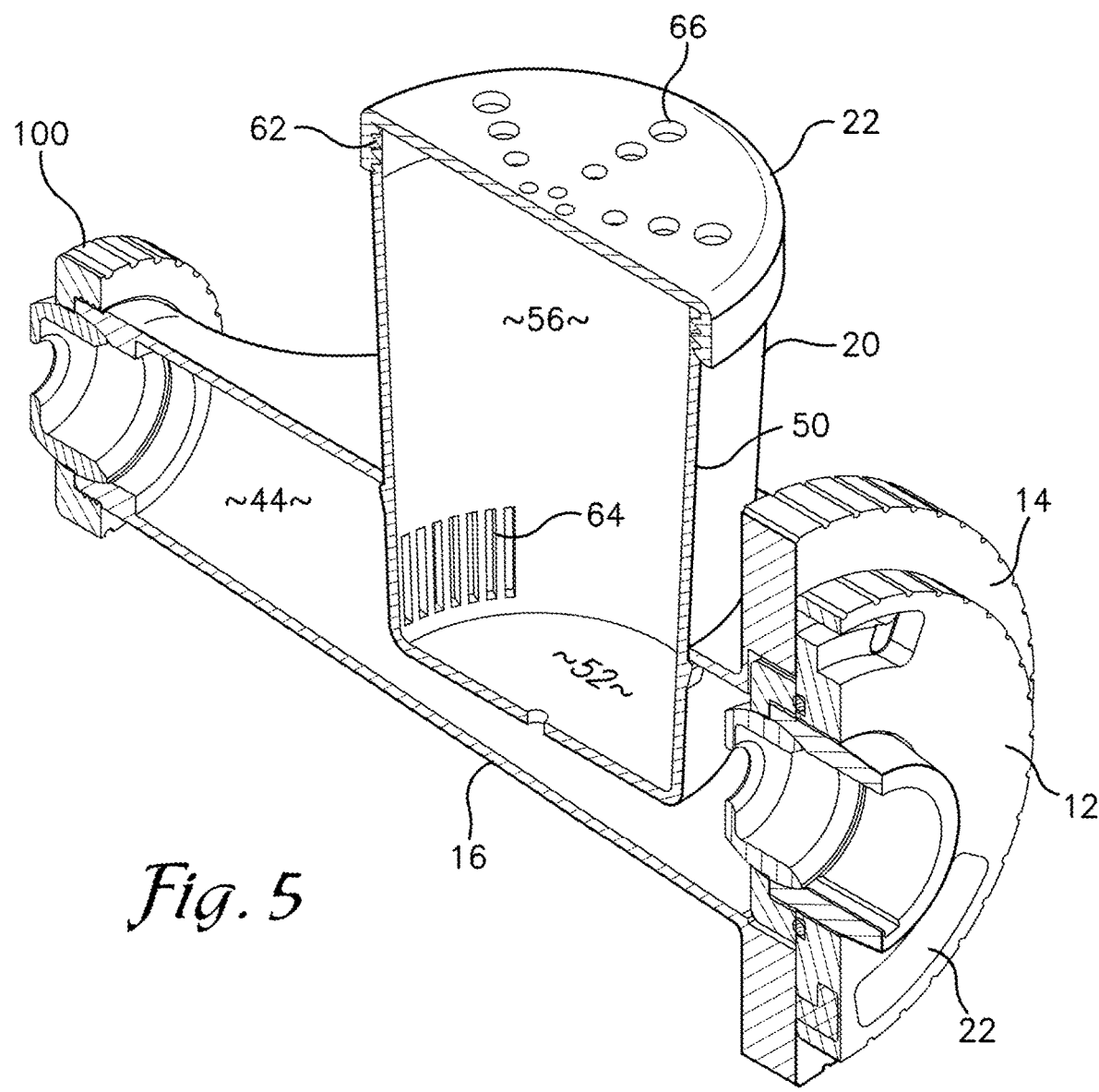
FIG. 5 is a cutaway view showing the interior structures of the chemical dispensing system of FIG. 4, constructed in accordance with another embodiment of the present invention.

Turning to FIGS. 1-6, a chemical dispensing system 10 constructed in accordance with an embodiment of the present invention is illustrated. The chemical dispensing system 10 broadly includes a mounting ring 12, a connector ring 14, a water guide 16, and a dispenser apparatus 18. In one embodiment, as shown in FIGS. 4 and 5, the dispenser apparatus 18 broadly includes a housing 20, and a porous cover 22. In another embodiment, as illustrated in FIGS. 1-3, the dispenser apparatus 18 further includes an adjustable basket 24 and a fastener 26. The components of the chemical dispensing system 10 may be made of natural or synthetic materials, e.g., metal, nylon, plastic, or any suitable material or combination of materials.

The mounting ring 12 is installed on a water return jet located in a swimming pool or spa. The mounting ring 12 may include grip ridges 28, internal threads, and two or more attachment apertures 32. The grip ridges 28 are located on the outside periphery of the mounting ring 12 and provide friction during installation. As described in greater detail below and also in the '541 Application, the internal threads may allow the user to attach or remove the mounting ring 12 to complimentary threads located on a water return jet. In another embodiment, the mounting ring 12 does not include internal threads and the inside surface of the mounting ring 12 is smooth. The two or more attachment apertures 32 of the mounting ring 12 are used to join the connector ring 14 to the mounting ring 12.

The connector ring 14 may include grip ridges 34 and at least two stop catches 36. As best seen in FIGS. 2 and 4, each stop catch 36 projects outwardly from the connector ring 14. During installation, the stop catches 36 are inserted into the attachment apertures 32 of the mounting ring 12, and the connector ring 14 is rotated to couple the connector ring 14 to the mounting ring 12. The connector ring 14 may be coupled to the water guide 16 by various means of attachment.

The water guide 16 is a hollow member that broadly includes a side opening 40 for receiving the dispenser apparatus 18 and one or more external threads 42. In one embodiment, the external threads may allow the user to attach or remove the water guide 16 to the complementary internal threads of the connector ring 14. In another embodiment, external threads 42 may be located on the downstream end of the water guide 16 and may be used to couple water return jet components 100 to direct the flow of treated water exiting the water guide 16 in various directions throughout a body of water. Those who are skilled in the art may envision other means of attaching the connector ring 14 and the water return jet components 100 to the water guide 16, e.g., adhesives, fasteners, welding, etc., without departing from the scope of the present invention.

Figure 6:
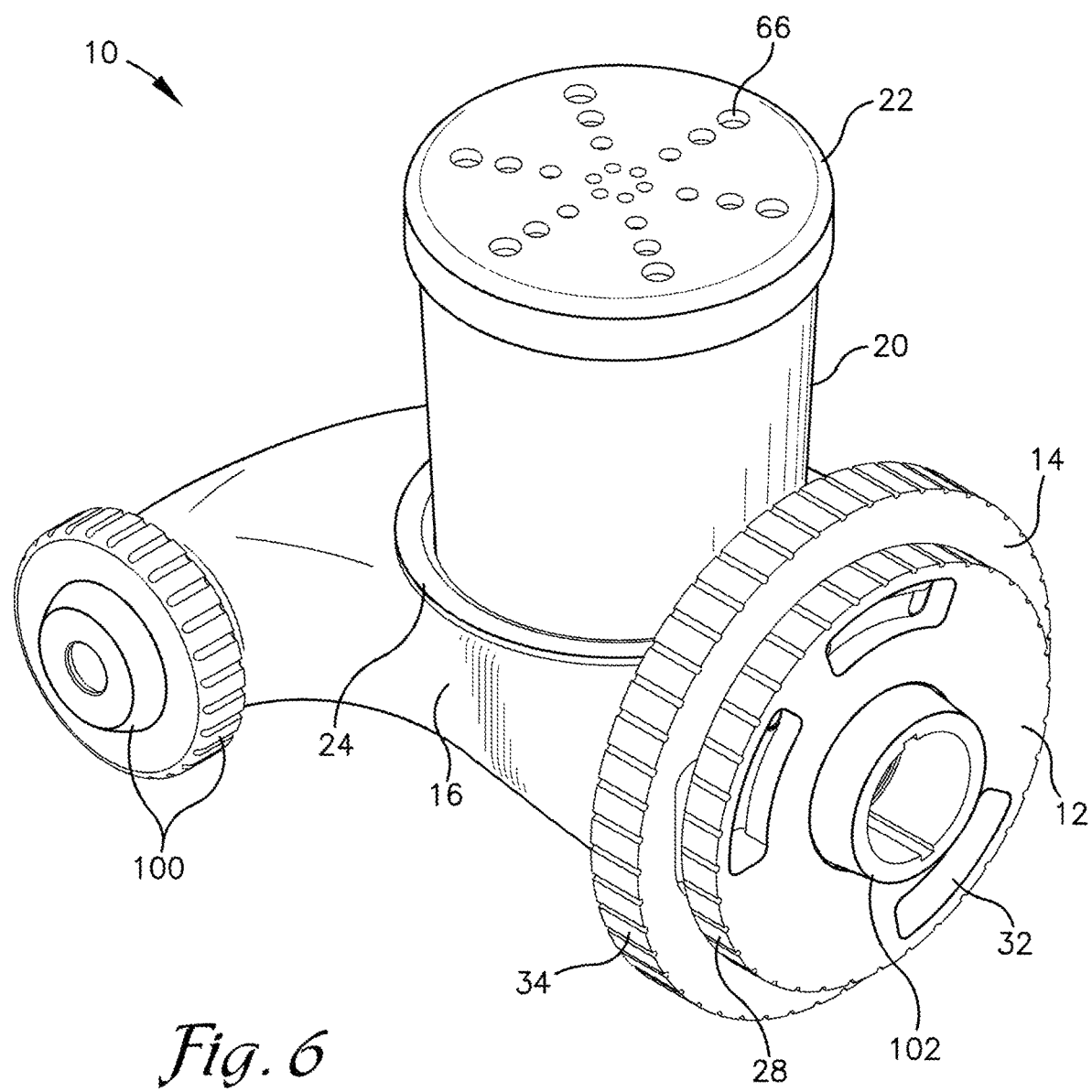
FIG. 6 is a perspective view of a chemical dispensing system attached to a water return jet, constructed in accordance with another embodiment of the present invention.

The central flow chamber 44 receives untreated water from a return jet. The length, shape, and diameter of the water guide 16 and the central flow chamber 44 may vary. In one embodiment, as shown in FIGS. 1-5, the water guide 16 and the central flow chamber 44 may have a generally linear shape. In another embodiment, as illustrated in FIG. 6 the water guide 16 and the central flow chamber 44 may be curved. The diameter of the central flow chamber 44 may be uniform or, as shown in FIGS. 1-6, the diameter of the central flow chamber 44 may narrow from one end to the other.

The dispenser apparatus 18 fastens to the side opening 40 of the water guide 16 and broadly comprises a housing 20 and a porous cover 22. The housing 20 is generally cylindrical and broadly includes a sidewall 50, an interior bottom surface 52, an upper edge 54, and an interior chamber 56. The sidewall 50 of the housing 20 may include a means of attaching the housing 20 to the water guide 16, for example, two or more tabs 58, external threads, etc. In one embodiment, as illustrated in FIG. 4, two or more tabs 58 may be located on the sidewall 50 allow a user to attach the housing 20 to the water guide 16. The upper edge 54 may include external threads 60 for removably attaching the housing 20 to complementary internal threads 62 on the porous cover 22. Those who are skilled in the art may envision other means of fastening the porous cover 22 to the housing 20 without departing from the scope of the present invention. In one embodiment, as shown in FIGS. 3 and 5, the interior bottom surface 52 of the housing 20 may be smooth. In another embodiment, the interior bottom surface 52 may include one or more openings for drainage when the dispenser apparatus 18 is removed from the water guide 16 and/or a body of water.

The height and shape of the sidewall 50 of the housing 20 may vary. The sidewall 50 may include one or more chemical exit openings 64. The shape, number, arrangement, and size of the chemical exit openings 64 in the sidewall 50 may vary. In one embodiment, as shown in FIGS. 2 and 4, the chemical exit openings 64 may be slit-shaped and located near the bottom edge of the sidewall 50. As illustrated in FIGS. 2 and 3, the chemical exit openings 64 may be located on both the upstream and the downstream sides of the sidewall 50. In another embodiment, as shown in FIGS. 4 and 5, the chemical exit openings 64 may be solely located on the downstream side of the sidewall 50.

The porous cover 22 may include internal threads 62 and one or more intake apertures 66. The internal threads 62 allow the use to attach or remove the porous cover 22 to the complementary external threads 60 of the housing 20. The number, shape, size, and arrangement of the intake apertures 66 may vary. For example, as illustrated in FIGS. 1-6, the intake apertures 66 are circular, vary in diameter, and radiate outward from the center of the porous cover 22. In another embodiment, the porous cover 22 may include numerous intake apertures 48 that are uniformly distributed. In yet another embodiment, the porous cover 22 may include a single intake aperture 48.

The porous cover 22 may be removed from the upper edge 54 of the housing 20 to position various kinds of water-soluble sanitizing chemicals inside interior chamber 52 of the housing 20. For example, pellets, briquettes, tablets, or granules made of water treatment chemicals, e.g., calcium hypochlorite compositions, that slowly dissolve when submerged underwater may be placed inside the housing 20. The porous cover 22 is reattached to the upper edge 54 of the housing 20 to retain the sanitizing chemicals inside the dispenser apparatus 18.

Turning to FIGS. 1-3, the dispenser apparatus 18 may further includes an adjustable basket 24. The adjustable basket 24 broadly includes a base 68 and a perimeter wall 70. The housing 20 of the dispenser apparatus 18 may nest within the adjustable basket 24. Various fasteners 26 (e.g., pins, screws, etc.) or adhesives may be used to attach the interior bottom surface 52 of the housing 20 to the base 68 of the adjustable basket 24. For example, in FIG. 2, the fastener 26 is a snap pin. As shown in FIG. 2, the base 68 may be smooth. In another embodiment, the base 68 may include one or more openings for drainage when the dispenser apparatus 18 is removed from the water guide 16 and/or a body of water.

The perimeter wall 70 of the adjustable basket 24 may include one or more openings 74 and a means of attaching the perimeter wall 70 to the water guide 16. The number, shape, size, and arrangement of the openings 74 may vary. For example, as shown in FIG. 2, groups of slit-shaped openings 74 are evenly spaced around the perimeter wall 70. Those who are skilled in the art may envision other opening 74 embodiments without departing from the scope of the present invention. As best seen in FIG. 2, two or more tabs 58 may be located on the outside of the perimeter wall 70 that allow a user to attach the adjustable basket 24 to the water guide 16. Other means of attachment, e.g., external threads, adhesives, etc., may be used to couple the adjustable basket 24 to the water guide 16.

Water exiting the return water jet flows through the central flow chamber 44 of the water guide 16 and beneath the dispenser apparatus 18 to create a downward-flowing current within the dispenser apparatus 18. Untreated water is drawn downward through the intake apertures 66 of the porous cover 22 and into the dispensing apparatus 18 where the water partially dissolves the sanitizing chemical stored inside the housing 20. The chemically treated water exits the through the chemical exit openings 64 in the housing 20 and mixes with the water flowing through the water guide 16. To regulate the rate of chemically treated water exiting the dispenser apparatus 18 into water guide 16, the housing 20 may be rotated, thereby adjusting the position of the chemical exit openings 64 within the central flow chamber 44.

In another embodiment, to control the amount of sanitizing chemical delivered to a body of water, the user selectively rotates the housing 20 within the adjustable basket 24 by rotating the housing 20 to the desired position. For example, in one embodiment, the one or more openings 74 in the adjustable basket 24 may be aligned with the chemical exit openings 64 of the housing 20 in a full open position to provide maximum release of sanitizing chemical. In another embodiment, the housing 20 may be rotated to partially align the chemical exit openings 64 in any intermediate position with the one or more openings 74 to regulate the release of sanitizing chemical. In yet another embodiment, to terminate the release of sanitizing chemical, the adjustable basket 24 may be rotated to completely close the chemical exit openings 64, thereby stopping the flow of chemically treated water into the water guide 16.

The pressure from the return water jet efficiently circulates the chemically treated water mixture throughout the swimming pool or spa. When the sanitizing chemical inside the housing 20 becomes depleted, the user rotatably removes the porous cover 22, places more sanitizing chemical inside the housing 20, and reattaches the porous cover 22 to the housing 20.

Turning now to FIGS. 4 and 5, the installation of one embodiment of the chemical dispensing system 10 will now be described in more detail. First, the dispenser apparatus 18 is assembled. One or more sanitizing chemicals are placed inside the interior chamber 56 of the housing 20 and the porous cover 22 is attached to the upper edge 54 of the housing 20. Specifically, the internal threads 62 located on the porous cover 22 are aligned with the external threads 60 of the house 20 using a rotational movement. The dispenser apparatus 18 may be attached to the water guide 16 by a rotating the dispensing apparatus 18 or by pushing downward on the dispensing apparatus 18 to force the two or more tabs 58 located on the sidewall 50 of housing 20 down and through the opening 40 in the water guide 16. The chemical exit openings 64 of the housing 20 are now positioned within the central flow chamber 44 to regulate the amount of sanitizing chemical delivered to the water flowing through the central flow chamber 44 of the water guide 16.

In another embodiment, as best seen in FIGS. 2 and 3, the dispenser apparatus is assembled and further includes an adjustable basket 24 and a fastener 26. The fastener 26 is used to attach the interior bottom surface 52 of the housing 20 to the base 68 of the adjustable basket 24. One or more sanitizing chemicals are placed inside the interior chamber 56 of the housing 20 and the porous cover 22 is attached to the upper edge 54 of the housing 20. Specifically, the internal threads 62 located on the porous cover 22 are aligned with the external threads 60 of the house 20 using a rotational movement. The dispenser apparatus 18 may be attached to the water guide 16 by a rotating the dispensing apparatus 18 or by pushing downward on the dispensing apparatus 18 to force the two or more tabs 58 located on the perimeter wall 70 of the adjustable basket 24 down and through the opening 40 on the water guide 16. The chemical exit openings 64 of the housing 20 are now positioned within the adjustable basket 24 to regulate the amount of sanitizing chemical delivered to the water flowing through the central flow chamber 44 of the water guide 16.

Second, the mounting ring 12 is installed. The outer fittings 102 of a return jet are temporarily removed from the side of a pool or spa by rotating them counterclockwise. The mounting ring 12 is positioned around the exposed return jet opening, and the outer fittings 102 of the return water jet are reattached to the side of the pool or spa with the mounting ring 12 in place. Specifically, the threads located on the outer fittings 102 are aligned with the internal threads of the mounting ring 12 and reattached to the pool or spa with a rotational movement.

Third, the connector ring 14 is used to connect the water guide 16 to the mounting ring 12. The connector ring 14, which is coupled to the water guide, is securely attached to mounting ring 12 by inserting the stop catches 36 of the connector ring 14 into the attachment apertures 32 of the mounting ring 12. The connector ring 14 is rotated to couple the connector ring 14 to the mounting ring 12. The direction of treated water exiting from the downstream end of the water guide 16 may be adjusted by attaching water jet components 100 to the external threads 42 of the water guide 16.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A chemical dispensing system comprising:
   a mounting ring;
   a connector ring;
   a water guide; and
   a dispenser apparatus comprising:
      a housing;
      a porous cover; and
      an adjustable basket.

2. The chemical dispensing system of claim 1, wherein the mounting ring includes an internal thread for rotatably attaching the mounting ring to a water return jet.

3. The chemical dispensing system of claim 1, wherein the mounting ring includes two or more attachment apertures.

4. The chemical dispensing system of claim 3, wherein the connector ring includes at least two stop catches that outwardly project from the connector ring and may be rotatably inserted into the two or more attachment apertures of the mounting ring to fasten the connector ring to the mounting ring.

5. The chemical dispensing system of claim 1, wherein the water guide includes a side opening configured to receive the dispenser apparatus.

6. The chemical dispensing system of claim 1, wherein the housing includes a sidewall, an interior bottom surface, an upper edge, an interior chamber, and one or more chemical exit openings.

7. The chemical dispensing system of claim 6, wherein the housing includes two or more tabs on the side wall for attaching the housing to the water guide.

8. The chemical dispensing system of claim 6, wherein the one or more chemical exit openings are a row of vertical slits located in the sidewall of the housing.

9. The chemical dispensing system of claim 1, wherein the water guide includes one or more external threads.

10. The chemical dispensing system of claim 1, wherein the porous cover includes one or more intake apertures for water intake.

11. The chemical dispensing system of claim 1, wherein the porous cover includes internal threads used to couple the porous cover to the housing.

12. The chemical dispensing system of claim 1, wherein the adjustable basket includes a base, a perimeter wall, and one or more openings in the perimeter wall.

13. The chemical dispensing system of claim 12, wherein the adjustable basket further includes a two or more tabs on the perimeter wall for attaching the adjustable basket to the water guide.

14. The chemical dispensing system of claim 12, wherein the base of the adjustable basket is smooth.

15. The chemical dispensing system of claim 12, wherein the dispenser apparatus further includes a fastener for attaching the housing to the base of the adjustable basket.

16. The chemical dispensing system of claim 12, wherein the housing nests inside the adjustable basket.

17. The chemical dispensing system of claim 16, wherein the one or more rows of openings are vertical slits located in the perimeter wall of the adjustable basket.

18. A chemical dispensing system comprising:
   a mounting ring that includes two or more apertures and an internal thread for rotatably attaching the mounting ring to a water return jet;
   a connector ring that includes at least two stop catches that outwardly project from the connector ring and the stop catches may be rotatably inserted into the two or more apertures of the mounting ring to fasten the connector ring to the mounting ring;
   a water guide; and
   a dispenser apparatus comprising:
      a housing;
      a porous cover; and
      an adjustable basket that includes a base, a perimeter wall, and one or more openings in the perimeter wall.

19. A chemical dispensing system comprising:
   a mounting ring that includes two or more apertures and an internal thread for rotatably attaching the mounting ring to a water return jet;
   a connector ring that includes at least two stop catches that outwardly project from the connector ring and the stop catches may be rotatably inserted into the two or more apertures of the mounting ring to fasten the connector ring to the mounting ring;
   a water guide; and
   a dispenser apparatus comprising:
      a housing;
      a porous cover;
      a fastener; and
      an adjustable basket that includes a base, a tab, a perimeter wall, one or more openings located in the perimeter wall,
         wherein the housing may be rotated within the adjustable basket.

* * * * *